United States Patent
Matsunaga et al.

(10) Patent No.: US 11,639,446 B2
(45) Date of Patent: May 2, 2023

(54) CATIONIC ELECTRODEPOSITION COATING COMPOSITION

(71) Applicant: KANSAI PAINT CO., LTD., Hyogo (JP)

(72) Inventors: Kenichiro Matsunaga, Kanagawa (JP); Hideki Iijima, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 424 days.

(21) Appl. No.: 16/651,046

(22) PCT Filed: Sep. 28, 2018

(86) PCT No.: PCT/JP2018/036436
§ 371 (c)(1),
(2) Date: Mar. 26, 2020

(87) PCT Pub. No.: WO2019/066029
PCT Pub. Date: Apr. 4, 2019

(65) Prior Publication Data
US 2020/0248009 A1    Aug. 6, 2020

(30) Foreign Application Priority Data
Sep. 29, 2017  (JP) .............................. JP2017-190636

(51) Int. Cl.
C09D 5/44    (2006.01)
C09D 125/14  (2006.01)
(Continued)

(52) U.S. Cl.
CPC ......... *C09D 5/4496* (2013.01); *C09D 5/4473* (2013.01); *C09D 125/14* (2013.01);
(Continued)

(58) Field of Classification Search
None
See application file for complete search history.

(56) References Cited

U.S. PATENT DOCUMENTS 5,089,101 A   2/1992  Hayashi et al.
5,418,263 A   5/1995  Sakamoto et al.
(Continued)

FOREIGN PATENT DOCUMENTS

CN    1094739    11/1994
CN    1712475    12/2005
(Continued)

OTHER PUBLICATIONS

Extended European Search Report dated May 26, 2021 in corresponding European Patent Application No. 18861893.8.
(Continued)

*Primary Examiner* — Louis J Rufo
(74) *Attorney, Agent, or Firm* — Wenderoth, Lind & Ponack, L.L.P.

(57) ABSTRACT

A cationic electrodeposition paint composition comprising a cationic base-containing resin (A), a blocked polyisocyanate compound (B), and a modified imidazole (C) having a specific structure, wherein the cationic base-containing resin (A) is a cationic base-containing epoxy resin and/or a cationic base-containing acrylic resin.

9 Claims, 1 Drawing Sheet

(51) Int. Cl.

| | | |
|---|---|---|
| *C09D 163/00* | (2006.01) | |
| *C25D 13/04* | (2006.01) | |
| *C25D 13/06* | (2006.01) | |
| *C25D 13/00* | (2006.01) | |
| *C25D 11/00* | (2006.01) | |
| *C25D 13/12* | (2006.01) | |
| *C08K 5/00* | (2006.01) | |

(52) U.S. Cl.
CPC ............ *C09D 163/00* (2013.01); *C25D 11/00* (2013.01); *C25D 13/00* (2013.01); *C25D 13/04* (2013.01); *C25D 13/06* (2013.01); *C25D 13/12* (2013.01); *C08K 5/0025* (2013.01)

(56) References Cited

U.S. PATENT DOCUMENTS

| | | | |
|---|---|---|---|
| 2005/0279254 A1* | 12/2005 | Toi ......................... | C08G 18/58 106/287.3 |
| 2006/0247341 A1 | 11/2006 | Hsieh et al. | |
| 2007/0023288 A1 | 2/2007 | Kuwano et al. | |
| 2019/0177464 A1 | 6/2019 | Miyagi et al. | |

FOREIGN PATENT DOCUMENTS

| | | |
|---|---|---|
| DE | 10 2008 061 329 | 6/2010 |
| GB | 2 184 124 | 6/1987 |
| JP | 6-200194 | 7/1994 |
| JP | 8-120222 | 5/1996 |
| JP | 2000-290542 | 10/2000 |
| JP | 2002-060680 | 2/2002 |
| JP | 2012-152725 | 8/2012 |
| JP | 2013-189524 | 9/2013 |
| JP | 2017-155203 | 9/2017 |
| WO | 2009/135600 | 11/2009 |
| WO | 2014/187782 | 11/2014 |
| WO | WO-2014187782 A1 * | 11/2014 ........... C08G 59/686 |
| WO | 2015/087932 | 6/2015 |
| WO | 2018/025970 | 2/2018 |
| WO | 2018/110670 | 6/2018 |

OTHER PUBLICATIONS

International Search Report dated Jan. 8, 2019 in International (PCT) Application No. PCT/JP2018/036436.

Bantu et al., "$CO_2$, Magnesium, Aluminum, and Zinc Adducts of N-Heterocyclic Carbenes as (Latent) Catalysts for Polymethane Synthesis", European Journal of Inorganic Chemistry, 2009, No. 13, pp. 1970-1976.

Coutelier et al., "N-Heterocyclic Carbene-Catalyzed Synthesis of Polyurethanes", Polymer Preprints, 2011, vol. 52, No. 2, pp. 290-291.

Examination Report dated Dec. 21, 2020 in corresponding Indian Patent Application No. 202017016672 with English-language translation.

* cited by examiner

CATIONIC ELECTRODEPOSITION COATING COMPOSITION

TECHNICAL FIELD

The present invention relates to a cationic electrodeposition paint composition.

BACKGROUND ART

Cationic electrodeposition paint compositions have excellent application workability and form a coating film with excellent corrosion resistance. They have thus been widely used for, for example, automobile parts, electrical equipment parts, and other industrial machinery for which such properties are required.

In general, cationic electrodeposition paint compositions comprise resin components comprising a cationic resin (e.g., an amino group-containing epoxy resin) and a curing agent (also called "crosslinking agent"; e.g., a blocked polyisocyanate compound), and a pigment dispersion paste containing a pigment dispersed with a resin for pigment dispersion. This paint composition is used for a coating bath, a current is applied using a substrate as a cathode and the counter electrode as anode, and a deposited coating film thus formed on the substrate is heated to form a coating film cured by cross-linking.

Although the blocked polyisocyanate compound does not react with resin at ordinary temperatures, the blocking agent dissociates when heated and regenerates isocyanate groups, thus allowing the crosslinking reaction with active hydrogen-containing resin to proceed. Therefore, with no pot life restriction, it is possible to provide a single-component paint; additionally, application to an active hydrogen-containing aqueous paint that contains water or alcohol as a medium is possible.

Examples of compounds known as a blocking agent used in the blocked polyisocyanate compound include compounds, such as phenol-based compounds, caprolactam-based compounds, oxime-based compounds, active methylene-based compounds, and pyrazole-based compounds. As dissociation catalysts for the blocking agent, organic tin compounds, such as dibutyltin dibenzoate, dioctyltin oxide, and dibutyltin oxide have been commonly used.

Organic tin compounds show a very high catalyst performance. However, in recent years, their toxicity has become a problem and catalysts that replace organic tin compounds have been required. As the replacement, catalysts, such as bismuth-based catalysts and zinc-based catalysts, have been developed (PTL (Patent Literature) 1 and PTL 2).

CITATION LIST

Patent Literature

PTL 1: JP2000-290542A
PTL 2: JP2012-152725A

SUMMARY OF INVENTION

Technical Problem

However, the conventional cationic electrodeposition paint compositions all contain a metal catalyst, which poses an environmental problem. There has also been other problems that bismuth-based catalysts and zinc-based catalysts are expensive, exert insufficient catalytic effects, and are unstable in paints.

The problem to be solved by the present invention is to provide a blocked polyisocyanate-based, novel cationic electrodeposition paint composition that exhibits catalyst effectiveness and paint stability, by using a catalyst other than metal catalysts.

Solution to Problem

As a result of extensive research to solve the above problems, the present inventors found that the problems can be solved by producing a cationic electrodeposition paint composition using a cationic base-containing resin (A), a blocked polyisocyanate compound (B), and a specific modified imidazole (C). Accordingly, the present invention provides the following items.

Item 1. A cationic electrodeposition paint composition comprising a cationic base-containing resin (A), a blocked polyisocyanate compound (B), and a modified imidazole (C) represented by the following Formula (1):

Formula (1)

wherein $R_1$, $R_2$, $R_3$, and $R_4$ may be identical or different, and each represents hydrogen or an organic group containing one or more carbon atoms, wherein the organic group may contain at least one member selected from the group consisting of oxygen, nitrogen, sulfur, and halogen, and two or more of $R_1$, $R_2$, $R_3$, and $R_4$ taken together may form a ring structure; and X represents oxygen or nitrogen, and when X represents oxygen, Y is absent and n is 1, and when X represents nitrogen, Y represents an organic group and n is an integer of 1 or more.

Item 2. The cationic electrodeposition paint composition according to Item 1, wherein the cationic base-containing resin (A) contains a cationic base-containing epoxy resin and/or a cationic base-containing acrylic resin.

Item 3. The cationic electrodeposition paint composition according to Item 1, wherein the cationic base of the cationic base-containing resin (A) is at least one member selected from the group consisting of an amino group, a quaternary ammonium base, and a sulfonium base.

Item 4. The cationic electrodeposition paint composition according to any one of Items 1 to 3, wherein the modified imidazole (C) is present in an amount of 0.01 to 10 mass %, based on the total resin solids content of the cationic electrodeposition paint composition.

Item 5. A coating method comprising immersing a metal substrate in an electrodeposition paint bath comprising the cationic electrodeposition paint composition of any one of Items 1 to 4 to perform electrodeposition coating.

Item 6. A method for producing a coated article, comprising forming a coating film by the coating method of Item 5.

Advantageous Effects of Invention

The present invention can provide a blocked polyisocyanate-based, novel cationic electrodeposition paint composition that exhibits catalyst effectiveness and paint stability, by using a catalyst other than metal catalysts.

DESCRIPTION OF EMBODIMENTS

The present invention relates to a cationic electrodeposition paint composition comprising a cationic base-containing resin (A), a blocked polyisocyanate compound (B), and a specific modified imidazole (C). The details are described below.

In the present specification, examples of alkyl include linear or branched alkyl groups containing 1 to 10 carbon atoms. More specific examples of alkyl include methyl, ethyl, n-propyl, isopropyl, n-butyl, sec-butyl, isobutyl, tert-butyl, 1-methylpropyl, n-pentyl, isopentyl, tert-pentyl, n-hexyl, 1,1-dimethylpropyl, n-heptyl, n-octyl, n-nonyl, n-decyl, and the like.

In the present specification, examples of alkenyl include linear or branched alkenyl groups containing 1 to 10 carbon atoms and at least one double bond. The number of double bonds may be, for example, one to two, or one. More specific examples of alkenyl include vinyl, allyl, 1-propenyl, 2-methyl-2-propenyl, isopropenyl, 1-butenyl, 2-pentenyl, 3-methyl-2-butenyl, 1-pentenyl, 5-hexenyl, 3-methyl-3-butenyl, 1-heptenyl, 2-octenyl, 3-nonenyl, 1-decenyl, and the like.

In the present specification, examples of alkynyl include linear or branched alkynyl groups containing 1 to 10 carbon atoms and at least one triple bond. The number of triple bonds may be, for example, one to two, or one. More specific examples of alkynyl include ethynyl, 1-propynyl, 2-butynyl, 1-methyl-2-propynyl, 1-pentynyl, 2-hexynyl, 3-heptynyl, 2-octynyl, 4-noninyl, 6-decinyl, and the like.

In the present specification, examples of cycloalkyl include cycloalkyl groups containing 3 to 10 carbon atoms. More specific examples of cycloalkyl include cyclopropyl, cyclobutyl, cyclopentyl, cyclohexyl, cycloheptyl, cyclooctyl, cyclononyl, cyclodecyl, and the like.

In the present specification, examples of cycloalkylalkyl include a cycloalkylalkyl group in which a single cycloalkyl moiety, i.e., a cycloalkyl group mentioned above (cycloalkyl containing 3 to 10 carbon atoms), is attached to an alkyl moiety, i.e., an alkyl group mentioned above (e.g., linear or branched alkyl containing 1 to 10 carbon atoms). More specific examples of cycloalkylalkyl includes cyclopropylmethyl, 10-cyclopropyldecyl, 8-cyclobutylnonyl, 3-cyclopentylpropyl, cyclohexylmethyl, cycloheptylmethyl, 2-cyclooctylethyl, 2-cyclononylethyl, cyclodecylmethyl, and the like.

In the present specification, examples of hydroxyalkyl include linear or branched alkyl groups containing 1 to 10 carbon atoms substituted with one hydroxyl group, such as hydroxymethyl, 1-hydroxyethyl, 2-hydroxyethyl, 1-hydroxypropyl, 2-hydroxypropyl, 3-hydroxypropyl, 1-hydroxybutyl, 2-hydroxybutyl, 3-hydroxybutyl, and 4-hydroxybutyl.

In the present specification, examples of alkoxy include an oxy group to which alkyl mentioned above (e.g., linear or branched alkyl containing 1 to 10 carbon atoms) is attached. More specific examples include methoxy, ethoxy, n-propoxy, isopropoxy, n-butoxy, isobutoxy, tert-butoxy, n-pentyloxy, n-isopentyloxy, n-hexyloxy, n-octyloxy, n-nonyloxy, n-decyloxy, and the like.

In the present specification, examples of alkoxyalkyl include an alkyl group mentioned above (e.g., linear or branched alkyl containing 1 to 10 carbon atoms) that contains one or more alkoxy groups mentioned above (e.g., linear or branched alkoxy containing 1 to 10 carbon atoms). More specific examples include methoxymethyl, ethoxymethyl, decyloxymethyl, n-propoxymethyl, n-butoxymethyl, 2-methoxyethyl, 1-methoxy-n-propyl, 3-methoxy-n-propyl, 2-ethoxy-n-butyl, 4-methoxy-n-butyl, 5-methoxy-n-pentyl, 6-methoxy-n-hexyl, 7-methoxy-n-hexyl, 8-methoxy-n-octyl, 9-methoxy-n-nonyl, 10-methoxy-n-decyl, and the like.

In the present specification, examples of thioalkoxy include a thio group to which alkyl mentioned above (e.g., linear or branched alkyl containing 1 to 10 carbon atoms) is attached. More specific examples include thiomethoxy, thioethoxy, n-thiopropoxy, thioisopropoxy, n-thiobutoxy, isothiobutoxy, tert-thiobutoxy, n-thiopentyloxy, n-isothiopentyloxy, n-thiohexyloxy, n-thiooctyloxy, n-thiononyloxy, n-thiodecyloxy, and the like.

In the present specification, examples of thioalkoxyalkyl include an alkyl group mentioned above (e.g., linear or branched alkyl containing 1 to 10 carbon atoms) that contains one or more thioalkoxy groups mentioned above (e.g., linear or branched thioalkoxy containing 1 to 10 carbon atoms). More specific examples include thiomethoxymethyl, thioethoxymethyl, thiodecyloxymethyl, n-thiopropoxymethyl, n-thiobutoxymethyl, 2-thiomethoxyethyl, 1-thiomethoxy-n-propyl, 3-thiomethoxy-n-propyl, 2-thioethoxy-n-butyl, 4-thiomethoxy-n-butyl, 5-thiomethoxy-n-pentyl, 6-thiothiomethoxy-n-hexyl, 7-thiomethoxy-n-hexyl, 8-thiomethoxy-n-octyl, 9-thiomethoxy-n-nonyl, 10-thiomethoxy-n-decyl, and the like.

In the present specification, examples of aryl include aryl groups containing 6 to 14 carbon atoms. More specific examples include phenyl, naphthyl, biphenylenyl, anthracenyl, phenanthryl, fluorenyl, tetrahydronaphthyl, and the like.

In the present specification, examples of aralkyl include an alkyl group mentioned above containing one or more aryl groups mentioned above. More specific examples include benzyl, phenethyl, diphenylmethyl, triphenylmethyl, naphthylmethyl, fluorenylmethyl, and the like.

In the present specification, examples of heterocyclic groups include a monocyclic or polycyclic, saturated or unsaturated heterocyclic group containing one or more (e.g., 1 to 3) heteroatoms selected from the group consisting of nitrogen, oxygen, and sulfur. More specific examples include morpholino, pyrrolidinyl, piperidino, piperazinyl, tetrahydrofuranyl, tetrahydropyranyl, tetrahydrothiophenyl, thiazolidinyl, oxazolidinyl, imidazolyl, pyrrolyl, thienyl, furyl, oxazolyl, isoxazolyl, thiazolyl, isothiazolyl, thiadiazolyl, pyrazolyl, pyrazolyl, tetrazolyl, pyridyl, pyrazyl, pyrimidinyl, pyridazinyl, indolyl, isoindolyl, indazolyl, triazolopyridyl, benzimidazolyl, benzoxazolyl, benzothiazolyl, benzothienyl, benzofuranyl, quinolyl, isoquinolyl, quinazolinyl, quinoxalinyl, methylenedioxyphenyl, dihydrothiazolyl, benzothiophenyl, and the like.

In the present specification, examples of mono- or dialkylamino include an amino group to which one or two alkyl groups mentioned above are attached. More specific examples include N-methylamino, N,N-diethylamino, N-methyl-N-ethylamino, N,N-di-n-propylamino, N,N-diisopropyl, N,N-di-n-butylamino, N-sec-butylamino, N-isobutylamino, N-tert-butylamino, N,N-di-1-methylpropylamino, N,N-di-n-pentylamino, N,N-di-isopentylamino, N-tert-pentylamino, N,N-di-n-hexylamino, N-1,1-dimethylpropylamino, N,N-di-n-heptylamino, N,N-di-n-octylamino, N,N-di-2-ethylhexylamino, N,N-di-n-nonylamino, N,N-di-n-decylamino, and the like.

In the present specification, examples of mono- or dialkylcarbamoylamino include an amino group to which one carbamoyl group containing one or two alkyl groups mentioned above are attached. More specific examples include (N-methylcarbamoyl)amino, N,N-diethylcarbamoylamino, (N-methyl-N-ethylcarbamoyl)amino, N,N-di-n-propylcarbamoylamino, N,N-diisopropylcarbamoylamino, N,N-di-n-butylcarbamoylamino, (N-sec-butylcarbamoyl)amino, (N-isobutylcarbamoyl) amino, (N-tert-butyl) carbamoylamino, N,N-di-1-methylpropvlcarbamoylamino, N,N-di-n-pentylcarbamoylamino, N,N-di-isopentylcarbamoylamino, (N-tert-pentylcarbamoyl)amino, N,N-di-n-hexylcarbamoylamino, N-1,1-dimethylpropylcarbamoylamino, N,N-di-n-heptylcarbamoylamino, N,N-di-n-octylcarbamoylamino, N,N-di-2-ethylhexylcarbamoylamino, N,N-di-n-nonylcarbamoylamino, N,N-di-n-decylcarbamoylamino, and the like.

Cationic Base-Containing Resin (A)

A cationic base-containing resin (A) may be, but is not particularly limited to, any known resin as long as the resin contains a cationic base. Of these, a cationic base-containing epoxy resin, a cationic base-containing acrylic resin, or both, are preferable, and a cationic base-containing epoxy resin is more preferable.

The cationic base contained in the cationic base-containing resin (A) is preferably at least one member selected from the group consisting of an amino group, a quaternary ammonium base, and a sulfonium base, and more preferably a secondary or tertiary amino group.

Cationic Base-Containing Epoxy Resin

Examples of the cationic base-containing epoxy resin include amino group-containing epoxy resin, quaternary ammonium base-containing epoxy resin, and sulfonium base-containing epoxy resin, and the like. All of these are suitable for use. These may be used alone or in a combination of two or more.

Of these, it is preferable to use an amino group-containing epoxy resin. Specific examples include (1) adducts of an epoxy resin with primary mono- and polyamines, secondary mono- and polyamines, or primary and secondary mixed polyamines (see, for example, U.S. Pat. No. 3,984,299), (2) adducts of an epoxy resin with secondary mono- and polyamines containing a ketimine-blocked primary amino group (see, for example, U.S. Pat. No. 4,017,438), (3) reaction products obtained by etherifying an epoxy resin and a hydroxyl compound containing a ketiminated primary amino group (see, for example, JPS59-043013A), and the like.

Examples of the primary mono- and polyamines, secondary mono- and polyamines, or primary and secondary mixed polyamines mentioned above in (1) as materials used for producing the amino group-containing epoxy resin include mono- or di-alkylamines, such as monomethylamine, dimethylamine, monoethylamine, diethylamine, monoisopropylamine, diisopropylamine, monobutylamine, and dibutylamine; alkanolamines, such as monoethanolamine, diethanolamine, mono(2-hydroxypropyl)amine, and monomethylaminoethanol; alkylene polyamines, such as ethylenediamine, propylenediamine, butylenediamine, hexamethylenediamine, diethylenetriamine, and triethylenetetramine; and the like.

Examples of the secondary mono- and polyamines containing a ketimine-blocked primary amino group mentioned above in (2) as materials used for producing the amino group-containing epoxy resin include ketiminated products obtained by reacting a ketone compound with, for example, diethylenetriamine, among the primary and secondary mixed polyamines mentioned above in (1) as materials used for producing the amine-added epoxy resin.

Examples of the ketiminated primary amino group-containing hydroxy compound mentioned above in (3) as a material used for producing the amino group-containing epoxy resin include hydroxy-containing ketiminated products obtained by reacting a ketone compound with a primary amino group- and hydroxy-containing compound, such as monoethanolamine or mono(2-hydroxypropyl)amine, among the primary mono- and polyamines, secondary mono- and polyamines, and primary and secondary mixed polyamines, mentioned above in (1) as materials used for producing the amino group-containing epoxy resin.

The amine value of the amino group-containing epoxy resin is preferably 10 to 100 mg KOH/g, and more preferably 30 to 80 mg KOH/g, based on the resin solids, from the standpoint of improved water dispersibility and corrosion resistance.

The sulfonium base-containing epoxy resin can be obtained by reacting a sulfide compound and a neutralizing acid with an epoxy resin, and introducing a sulfonium base simultaneously with when the epoxy group undergoes ring-opening (see, for example, JPH06-128351A and JPH07-206968A).

In terms of the quaternary ammonium salt epoxy resin, an epoxy resin containing a quaternary ammonium base can be obtained by reacting, with an epoxy resin, a salt obtained by adding an acid to an amine compound, or by reacting an amine compound with an epoxy resin, and then adding an acid thereto (see, for example, JP2013-203966A).

The epoxy resin used for producing the cationic base-containing epoxy resin is a compound having at least one epoxy group, and preferably two or more epoxy groups, per molecule. The molecular weight is preferably such that the epoxy resin has a number average molecular weight of at least 300, preferably 400 to 4000, and more preferably 800 to 2500; and has an epoxy equivalent of at least 160, preferably 180 to 2500, and more preferably 400 to 1500. Examples of such epoxy resins for use include those obtained by reacting a polyphenol compound with epihalohydrin (such as epichlorohydrin).

Examples of polyphenol compounds that can be used for forming the epoxy resin include bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, and the like.

As the epoxy resin obtained by a reaction between a polyphenol compound and epihalohydrin, resins derived from bisphenol A and represented by the following formula:

wherein n=0 to 8,
are preferable.

Examples of commercially available products of the epoxy resin include products sold under the trade names of jER828EL, jER1002, jER1004, and jER1007 by Mitsubishi Chemical Corporation.

The cationic base-containing epoxy resin for use may contain a polyalkylene oxide chain in the resin skeleton. Such epoxy resins can be obtained by (α) a method comprising reacting an epoxy resin having at least one epoxy group, preferably two or more epoxy groups with alkylene oxide or polyalkylene oxide to introduce a polyalkylene oxide chain; (β) a method comprising reacting the polyphenol compound with polyalkylene oxide having at least one epoxy group, preferably two or more epoxy groups to introduce a polyalkylene oxide chain; or the like. Epoxy resins originally containing polyalkylene oxide chains may also be used (see, for example, JPH08-337750A).

The alkylene group in a polyalkylene oxide chain is preferably alkylene containing 2 to 8 carbon atoms, more preferably ethylene, propylene, or butylene, and particularly preferably propylene.

As a constituent of polyalkylene oxide, the content of the polyalkylene oxide chain is usually 0.0 to 15 mass % based on the solids mass content of the cationic base-containing epoxy resin from the standpoint of improved paint stability, appearance, and corrosion resistance.

If necessary, the cationic base-containing epoxy resin may be modified with a modifier. The modifier is not particularly limited as long as it is a resin or compound that is reactive with an epoxy resin. Examples of usable modifiers include polyols, polyether polyols, polyester polyols, polyamidoamines, polycarboxylic acids, and fatty acids; polyisocyanate compounds and compounds obtained by reacting polyisocyanate compounds; lactone compounds such as ε-caprolactone; acrylic monomers and compounds obtained by polymerization reaction of acrylic monomers; xylene formaldehyde compounds; and epoxy compounds. These modifiers can be used alone or in a combination of two or more.

The amount of the modifier used is not strictly limited, and can be suitably changed, for example, according to the intended use of the paint composition. From the standpoint of improved appearance and corrosion resistance, it is suitable that the amount of the modifier is usually 0 to 50 mass %, preferably 0.1 to 35 mass %, and more preferably 1 to 20 mass %, based on the solids mass content of the cationic base-containing epoxy resin.

The addition reaction to the epoxy resin can usually be performed in a suitable solvent at a temperature of about 80 to 170° C., and preferably about 90 to 150° C. for about 1 to 6 hours, and preferably about 1 to 5 hours.

Examples of the solvent include hydrocarbon solvents such as toluene, xylene, cyclohexane, and n-hexane; ester solvents such as methyl acetate, ethyl acetate, and butyl acetate; ketone solvents such as acetone, methyl ethyl ketone, methyl isobutyl ketone, and methyl amyl ketone; amide solvents such as dimethylformamide and dimethylacetamide; alcohol solvents such as methanol, ethanol, n-propanol, and iso-propanol; ether alcohol compounds such as ethylene glycol monobutyl ether and diethylene glycol monoethyl ether; and mixtures thereof.

The cationic base-containing epoxy resin usually has a number average molecular weight of 1000 to 50000, more preferably 1300 to 20000, and particularly preferably 1600 to 10000, from the standpoint of appearance and corrosion resistance.

When the cationic base of the cationic base-containing epoxy resin is an amino group, the cationic base-containing resin (A) has an amine value of usually 20 mg KOH/g or more, preferably 30 to 200 mg KOH/g, and more preferably 35 to 150 mg KOH/g, based on the resin solids content. The amine value as used herein is measured in accordance with JIS K 7237-1995. All of the amine values are based on the resin solids content (mg KOH/g).

In the present specification, the number-average molecular weight and weight-average molecular weight refer to values determined by converting the retention time (retention volume) measured with gel permeation chromatography (GPC) into a molecular weight of a polystyrene based on the retention time (retention volume) of a polystyrene standard with a known molecular weight measured under the same conditions. More specifically, the measurement is performed using an HLC8120GPC gel permeation chromatography apparatus (trade name, produced by Tosoh Corporation) with four columns (TSKgel G-4000HXL, TSKgel G-3000HXL, TSKgel G-2500HXL, and TSKgel G-2000HXL; trade names, all by Tosoh Corporation) under the following conditions: mobile phase: tetrahydrofuran; measurement temperature: 40° C.; flow rate: 1 mL/min; and detector: RI.

Cationic Base-Containing Acrylic Resin

The cationic base-containing acrylic resin can be produced by radical copolymerization of a cationic base-containing acrylic monomer and other monomers.

Specific examples of the cationic base-containing acrylic monomer include amino group-containing acrylic monomers and their quaternary chlorides, such as N,N-dimethylaminoethyl(meth)acrylate, N,N-diethylaminoethyl(meth)acrylate, N,N-dimethylaminopropyl(meth)acrylate, and N,N-di-t-butylaminoethyl(meth)acrylate; quaternary ammonium base-containing acrylic monomers, such as (meth)acryloyloxyethyl trimethyl ammonium chloride, (meth)acryloyloxyethyl dimethyl benzyl ammonium chloride, (meth)acryloyloxyethyl trimethyl ammonium methyl sulfate, and (meth)acryloyloxyethyl dimethyl ethyl ammonium ethyl sulfate; tertiary sulfonium base-containing acrylic monomers, such as 4-(dimethylsulfonio)phenyl methacrylate; and the like. These may be used alone or in a combination of two or more.

The other monomers may be monomers that are other than the cationic base-containing acrylic monomers and that are copolymerizable with the cationic base-containing acrylic monomers. Examples include aromatic vinyl monomers, such as styrene, vinyl toluene, and α-methyl styrene. Examples include addition products of methyl(meth)acrylate, ethyl(meth)acrylate, n-propyl(meth)acrylate, isopropyl (meth)acrylate, n-butyl(meth)acrylate, isobutyl(meth)acrylate, t-butyl(meth)acrylate, cyclohexyl(meth)acrylate, 2-ethylhexyl(meth)acrylate, 2-hydroxyethyl(meth)acrylate, 2-hydroxypropyl(meth)acrylate, 4-hydroxybutyl(meth)acrylate, or 2-hydroxyethyl(meth)acrylate, with caprolactone (e.g., PLACCEL FA-2 and FM-3, trade names, produced by Daicel Corporation), polyalkylene glycol(meth)acrylate, and the like. These may be used alone or in a combination of two or more.

The cationic base-containing acrylic resin can be obtained by a radical copolymerization reaction using the above monomers by a known method.

The cationic base-containing acrylic resin has a hydroxy value of usually 0 to 300 mg KOH/g, and preferably 50 to 200 mg KOH/g. The cationic base-containing acrylic resin has a number average molecular weight of usually 1000 to 100000, and preferably 2000 to 30000. The cationic base-containing acrylic resin has an amine value of usually 0.1 to 300 mg KOH/g, and preferably 10 to 150 mg KOH/g.

It is also possible to radically copolymerize a reactive functional group-containing acrylic monomers with other monomers to synthesize an acrylic resin, and then react the reactive functional groups with a cationic base-containing compound to introduce the cationic base into the acrylic resin. For example, an active hydrogen-containing amine compound may be added to glycidyl groups of a copolymer of glycidyl(meth)acrylate-containing polymerizable unsaturated monomers to add amino groups to the acrylic resin. Examples of the amine compound include primary mono- and polyamines; secondary mono- and polyamines; primary and secondary mixed polyamines; secondary mono- and polyamines containing ketiminated primary amino groups; hydroxyl compounds containing ketiminated primary amino groups; and the like.

Blocked Polyisocyanate Compound (B)

The blocked polyisocyanate compound (B) is a product generated through an addition reaction of a polyisocyanate compound (b-1) with a blocking agent (b-2). If necessary, an active hydrogen-containing compound other than the blocking agent (b-2) may be used and reacted, together with the blocking agent (b-2), with the polyisocyanate compound (b-1).

As the polyisocyanate compound (b-1), a known polyisocyanate compound can be used. Examples include tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI [polymethylene polyphenyl isocyanate], bis(isocyanatemethyl)cyclohexane, tetramethylene diisocyanate, hexamethylene diisocyanate, methylene diisocyanate, isophorone diisocyanate, and like aromatic, aliphatic, or alicyclic polyisocyanate compounds; cyclopolymers or biurets of these polyisocyanate compounds; and combinations thereof.

The blocking agent (b-2) is added to the isocyanate groups of the polyisocyanate compound (b-1) to block the isocyanate groups. The blocked polyisocyanate compound (B) produced through the addition is stable at ordinary temperatures. When heated, however, to a temperature at which coating films are baked (for example, about 80 to 200° C.), it is desirable that the blocking agent dissociates to regenerate free isocyanate groups.

Examples of the blocking agent (b-2) include oxime-based compounds, phenol-based compounds, alcohol-based compounds, lactam-based compounds, active methylene-based compounds, pyrazole-based compounds, mercaptan-based compounds, acid amide-based compounds, imide-based compounds, amine-based compounds, imidazole-based compounds, urea-based compounds, carbamate ester-based compounds, imine-based compounds, sulfite-based compounds, and the like. These may be used alone or in a combination of two or more.

Examples of oxime-based compounds include methyl ethyl ketoxime, cyclohexanone oxime, and the like. Examples of phenol-based compounds include phenol, para-t-butylphenol, cresol, and the like. Examples of alcohol-based compounds include n-butanol, 2-ethylhexanol, phenylcarbinol, methylphenylcarbinol, ethylene glycol monomethyl ether, ethylene glycol monoethyl ether, ethylene glycol monobutyl ether, diethylene glycol monoethyl ether, ethylene glycol, propylene glycol, propylene glycol monomethyl ether, methoxy methanol, and the like. Examples of lactam-based compounds include ε-caprolactam, γ-butyrolactam, and the like. Examples of active methylene-based compounds include dimethyl malonate, diethyl malonate, diisopropyl malonate, ethyl acetoacetate, isopropyl acetoacetate, methyl acetoacetate, isopropyl acetoacetate, acetylacetone, and the like. Examples of pyrazole-based compounds include pyrazole, 3,5-dimethylpyrazole, 3-methylpyrazole, 4-bromo-3,5-dimethylpyrazole, 4-nitro-3,5-dimethylpyrazole, 4-benzyl-3,5-dimethylpyrazole, methyl-5-methylpyrazole-3-carboxylate, 3-methyl-5-phenylpyrazole, 3,5-dimethylpyrazole-4-carboxyanilide, and the like. Examples of mercaptan-based compounds include butyl mercaptan, t-butyl mercaptan, hexyl mercaptan, t-dodecyl mercaptan, 2-mercaptobenzothiazole, thiophenol, methyl thiophenol, ethyl thiophenol, and the like. Examples of acid amide-based compounds include acetanilide, acetanisidide, acrylamide, methacrylamide, acetamide, stearamide, benzamide, and the like. Examples of imide-based compounds include succinimide, phthalimide, maleimide, and the like. Examples of amine-based compounds include diphenylamine, phenylnaphthylamine, xylidine, N-phenylxylidine, carbazole, aniline, naphthylamine, butylamine, dibutylamine, butylphenylamine, and the like. Examples of imidazole-based compounds include imidazole, 2-ethylimidazole, and the like. Examples of urea-based compounds include urea, thiourea, ethylene urea, ethylene thiourea, diphenyl urea, and the like. Examples of carbamate ester-based compounds include phenyl N-phenylcarbamate and the like. Examples of imine compounds include ethylene imine, propylene imine, and the like. Examples of sulfite-based compounds include sodium bisulfite, potassium bisulfite, and the like.

Modified Imidazole (C)

The modified imidazole (C) is a compound represented by the following Formula (1).

Formula (1)

wherein $R_1$, $R_2$, $R_3$, and $R_4$ may be identical or different, and each represents hydrogen or an organic group containing one or more carbon atoms, wherein the organic group may contain at least one member selected from the group consisting of oxygen, nitrogen, sulfur, and halogen, and two or more of $R_1$, $R_2$, $R_3$, and $R_4$ taken together may form a ring structure; and X represents oxygen or nitrogen, and when X represents oxygen, Y is absent and n is 1, and when X represents nitrogen, Y represents an organic group and n is an integer of 1 or more.

When $R_1$, $R_2$, $R_3$, and/or $R_4$ are organic groups, examples of the organic groups include monovalent organic groups, such as alkyl, alkenyl, alkynyl, cycloalkyl, cycloalkylalkyl, hydroxyalkyl, alkoxy, thioalkoxy, alkoxyalkyl, thioalkoxyalkyl, aryl, arylalkyl, aralkyl, and heterocyclic groups.

X preferably represents nitrogen. When X represents nitrogen, examples of the organic group represented by Y include aryl, aralkyl, and the like. Examples of the aryl include those mentioned above, with phenyl and naphthyl being preferable, and phenyl being more preferable. Examples of the aralkyl include those mentioned above, with phenylalkyl and naphthylalkyl being preferable, and phenylalkyl being more preferable. The aryl or aralkyl represented by Y may be substituent or unsubstituted. When the aryl or aralkyl represented by Y is substituted, examples of the substituent include halogen (preferably chlorine or fluorine, and more preferably chlorine), alkyl, and the like. When the aryl or aralkyl is substituted, the number of substituents is not limited, and is, for example, 1 to 3, and preferably 1 to 2. When the aryl or aralkyl represented by Y contains two or more substituents, the substituents may be identical or different.

Examples of Y include hydrocarbon containing one or more aromatic rings; and the like. Examples include a divalent group represented by the following Formula (2).

Formula (2)

In the formula above, $R_7$ and $R_8$ may be identical or different, and each represents hydrogen or alkyl, and p is an integer of 0 or more.

When $R_7$ and/or $R_8$ represent alkyl, examples of the alkyl include alkyl groups containing 1 to 10 carbon atoms, preferably 1 to 6 carbon atoms, more preferably 1 to 3 carbon atoms, more preferably 1 to 2 carbon atoms, and more preferably 1 carbon atom. $R_7$ and $R_8$ may be identical or different, and are preferably identical.

p is an integer of 0 or more, and preferably 1 to 4. When p is 2 or more, a plurality of the groups of:

wherein $R_7$ and $R_8$ are as defined above,
may be identical or different. In Formula (2), the above moiety is preferably attached to nitrogen at the para position; thus, the following structure is preferable.

In the formula, $R_7$ and $R_8$ are as defined above.
Further, in Formula (2), the following moiety:

is also preferably attached to nitrogen at the para position; thus, the following structure is preferable.

Examples of Y include a group represented by the following Formula (3):

Formula (3)

wherein $R_9$, $R_{10}$, and $R_{11}$ may be identical or different, and each represents an organic group containing one or more carbon atoms, wherein the organic group may contain at least one member selected from the group consisting of oxygen, nitrogen, sulfur, and halogen;
S and t represent 0 or 1, and when s and/or t are 0, the moiety:

represents hydrogen; and
q, r, u, v, and w each independently represent an integer of 0 to 4, and when q is 0, at least one of s and t is 1.

In this embodiment, the group represented by Formula (3) above is preferably a trivalent or higher-valent group; i.e., in Formula (3) above, the total of s, t, and q is preferably 3 or more.

In this embodiment, examples of the organic groups represented by $R_9$, $R_{10}$, and $R_{11}$ include alkyl, alkenyl, alkynyl, cycloalkyl, cycloalkylalkyl, mono- or di-alkylamino (preferably dialkylamino), mono- or di-alkylcarbamoylamino (preferably dialkylcarbamoylamino), and the like.

In another embodiment according to the present invention, two or more of $R_1$, $R_2$, $R_3$, $R_4$, and Y (typically, adjacent two of $R_4$, $R_2$, $R_3$, and $R_4$), taken together with each other, may form a ring structure.

For example, when $R_2$ and $R_3$ taken together form a ring structure, the structure can be as shown in the following Formula (4).

Formula (1)

In the formula above, $R_1$, $R_4$, and Y are as defined above; and $R_{12}$, $R_{13}$, $R_{14}$, and $R_{15}$ may be identical or different, and each represents hydrogen or an organic group containing one or more carbon atoms, wherein the organic group may contain at least one member selected from the group consisting of oxygen, nitrogen, sulfur, and halogen.

In this embodiment, when $R_{12}$, $R_{13}$, $R_{14}$, and/or $R_{15}$ are organic groups, examples of the organic groups include monovalent organic groups, such as alkyl, alkenyl, alkynyl, cycloalkyl, cycloalkylalkyl, hydroxyalkyl, alkoxy, thioalkoxy, alkoxyalkyl, thioalkoxyalkyl, aryl, arylalkyl, aralkyl, and heterocyclic groups.

When $R_1$, $R_2$, $R_3$, $R_4$, $R_{12}$, $R_{13}$, $R_{14}$, $R_{15}$, and Y are organic groups, the organic groups may be resins. Examples of the resins include acrylic resin, polyester resin, urethane resin, epoxy resin, polyisocyanate resin, and the like. In this embodiment, the molecular weight of the resin represented by $R_1$, $R_2$, $R_3$, $R_4$, or Y is not particularly limited, and is preferably 300 or more, more preferably 500 or more, and still more preferably 800 or more.

The modified imidazole (C) preferably has low solubility in water, and is typically insoluble in water. Therefore, in Formula (1), it is preferable that at least one member selected from $R_1$, $R_2$, $R_3$, $R_4$, and Y is preferably an organic group containing 6 or more carbon atoms, more preferably an organic group containing 8 or more carbon atoms, and still more preferably an organic group containing 21 or more carbon atoms.

In one embodiment, Y is an organic group containing 21 or more carbon atoms.

In another embodiment, $R_1$ or $R_4$ is an organic group containing 6 to 18 (preferably 6 to 12) carbon atoms. The organic group is alkyl, alkenyl, alkynyl, cycloalkyl, cycloalkylalkyl, hydroxyalkyl, alkoxy, thioalkoxy, alkoxyalkyl, thioalkoxyalkyl, aryl, arylalkyl, aralkyl, or a heterocyclic group.

In another embodiment, one of $R_1$ and $R_4$ is an organic group containing 1 to 5 carbon atoms, and the other of $R_1$ and $R_4$ is an organic group containing 6 to 18 (preferably 6 to 12) carbon atoms. The organic group represented by $R_1$ and the organic group represented by $R_4$ are each independently alkyl, alkenyl, alkynyl, cycloalkyl, cycloalkylalkyl, hydroxyalkyl, alkoxy, thioalkoxy, alkoxyalkyl, thioalkoxyalkyl, aryl, arylalkyl, aralkyl, or a heterocyclic group.

In another embodiment, one of $R_1$ and $R_4$ is an organic group containing 1 to 5 carbon atoms, and the other of $R_1$ and $R_4$ is an organic group containing 6 to 18 (preferably 6 to 12) carbon atoms. The organic group represented by $R_1$ and the organic group represented by $R_4$ are each independently alkyl, alkenyl, alkynyl, hydroxyalkyl, alkoxy, thioalkoxy, alkoxyalkyl, thioalkoxyalkyl, aryl, arylalkyl, aralkyl, or a heterocyclic group; and $R_2$ and $R_3$ each represent hydrogen.

In another embodiment, $R_1$ and $R_4$ each represent an organic group containing 6 to 18 (preferably 6 to 12) carbon atoms. The organic group represented by $R_1$ and the organic group represented by $R_4$ are each independently alkyl, alkenyl, alkynyl, cycloalkyl, cycloalkylalkyl, hydroxyalkyl, alkoxy, thioalkoxy, alkoxyalkyl, thioalkoxyalkyl, aryl, arylalkyl, aralkyl, or a heterocyclic group.

In another embodiment, $R_1$ and $R_4$ each represent an organic group containing 6 to 18 (preferably 6 to 12) carbon atoms. The organic group represented by $R_1$ and the organic group represented by $R_4$ are each independently alkyl, alkenyl, alkynyl, hydroxyalkyl, alkoxy, thioalkoxy, alkoxyalkyl, thioalkoxyalkyl, aryl, arylalkyl, aralkyl, or a heterocyclic group; and $R_2$ and $R_3$ each represent hydrogen.

The modified imidazole (C) preferably contains a counter ion in the same molecule to balance the charges.

Examples of the method for producing the modified imidazole (C) include the following methods.

A method for producing a modified imidazole (C) in which X in Formula (1) is oxygen (hereinafter referred to as "the modified imidazole (C1)," the method comprising reacting a nitrogen-containing organic compound represented by the following Formula (5):

Formula (5)

wherein $R^1$, $R^2$, and $R^3$ are as defined above,

(hereinafter referred to as "the nitrogen-containing organic compound (5)") with dialkyl carbonate (6) represented by the following Formula (6):

Formula (6)

wherein $R^4$ is as defined above, (hereinafter referred to as "the dialkyl carbonate (6)") to produce a modified imidazole (C1) represented by the following formula (7):

Formula (7)

wherein $R^1$, $R_2$, $R_3$, and $R_4$ are as defined above.

Preferable examples of the nitrogen-containing organic compound (5) include 1-methylimidazole, 1-butylimidazole, 1-octylimidazole, and the like.

Preferable examples of the dialkyl carbonate (6) include dimethyl carbonate and the like. The amount of the dialkyl carbonate (6) to be used is usually 1 mol or more, and preferably 1 to 6 mol, per mol of the nitrogen-containing organic compound (5).

Solvents may or may not be used. When used, solvents are not particularly limited as long as they do not affect the reaction. Specific examples of solvents include monohydric alcohol solvents, such as methanol, ethanol, propanol, butanol, pentanol, hexanol, 1-methoxy-2-propanol, and ethoxyethanol; polyol solvents, such as ethylene glycol, propylene glycol, and diethylene glycol; glycol monoalkyl ether solvents, such as dipropylene glycol mono n-butyl ether, dipropylene glycol monomethyl ether, tripropylene glycol monomethyl ether, propylene glycol mono n-propyl ether, dipropylene glycol mono n-propyl ether, propylene glycol mono n-butyl ether, tripropylene glycol mono n-butyl ether, propylene glycol monomethyl ether, and diethylene glycol monoethyl ether; and the like, with monohydric alcohol solvents being preferable, and methanol being particularly preferable. The amount of the solvent to be used is usually 50 parts by weight or less, and preferably 10 parts by weight or less, per part by weight of the nitrogen-containing organic compound (5).

After completion of the reaction, the reaction liquid is concentrated, and the solvent is removed to thus isolate the modified imidazole (C1). The unreacted nitrogen-containing organic compound (5) and dialkyl carbonate (6) when remaining in the reaction liquid can also be removed by concentrating the reaction liquid.

A method for producing a modified imidazole (C) in which X in Formula (1) is nitrogen (hereinafter referred to as "the modified imidazole (C2)," the method comprising reacting an isocyanate compound represented by the following Formula (8):

Formula (8)

wherein Y and n are as defined above for Formula (1), (hereinafter referred to as "the isocyanate compound (8)") with the modified imidazole (C1) to produce a modified imidazole (C2) represented by Formula (9):

Formula (9)

wherein $R_1$, $R_2$, $R_3$, $R_4$, Y and n are as defined above for Formula (1).

In one embodiment according to the present invention, some compounds of the modified imidazole (C2) can also be produced by a method comprising reaction of an isocyanate compound represented by the following Formula (8'):

Formula (8')

wherein Z is a divalent organic group, m is an integer of 1 or more, and n is as defined above for Formula (1), wherein the organic group represented by Z may be, but is not particularly limited to being, a known organic group, and specific examples include linear, branched, and/or cyclic alkylene groups, (hereinafter referred to as "the isocyanate compound (8')") with the modified imidazole (C1), wherein before, after, and/or simultaneously with the reaction, a compound (C3) that is other than the modified imidazole (C1) and that reacts with isocyanate groups (hereinafter referred to as "the compound (C3)") is further reacted, to thus produce an imidazole compound (C2') represented by the following Formula (9'):

Formula (9')

wherein $R_1$, $R_2$, $R_3$, $R_4$, Z, m, and n are as defined above, and A represents an organic group derived from the compound (C3), wherein when m is 2 or more, As may be identical or different.

The isocyanate compound (8) and isocyanate compound (8') above are compounds containing one or more isocyanate groups per molecule.

Examples of isocyanate compounds containing one isocyanate group per molecule include methyl isocyanate, ethyl isocyanate, propyl isocyanate, butyl isocyanate, lauryl isocyanate, cyclohexyl isocyanate, phenyl isocyanate, tolylene isocyanate, derivatives of these isocyanate compounds, and the like.

Examples of compounds containing two or more isocyanate groups per molecule include aliphatic polyisocyanates, alicyclic polyisocyanates, araliphatic polyisocyanates, aromatic polyisocyanates, derivatives of these polyisocyanates, and the like.

Examples of aliphatic polyisocyanates include trimethylene diisocyanate, tetramethylene diisocyanate, hexamethylene diisocyanate (EDI), 1,2-, 2,3- or 1,3-butylene diisocyanate, 2,4,4- or 2,2,4-trimethyl hexamethylene diisocyanate, and the like.

Examples of alicyclic polyisocyanates include 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (isophorone diisocyanate; IPDI), 4,4'-, 2,4'- or 2,2'-dicyclohexylmethane diisocyanate or a mixture thereof (hydrogenated MDI), methyl-2,4-cyclohexane diisocyanate, methyl-2,6-cyclohexane diisocyanate, 1,3- or 1,4-bis(isocyanatomethyl)cyclohexane or a mixture thereof (hydrogenated XDI), norbornane diisocyanate (NBDI), and the like.

Examples of aromatic polyisocyanates include aromatic diisocyanates, such as m- or p-phenylene diisocyanate or a mixture thereof, 2,4- or 2,6-tolylene diisocyanate or a mixture thereof (TDI), 4,4'-, 2,4'- or 2,2'-diphenylmethane diisocyanate or a mixture thereof (MDI), 4,4'-toluidine diisocyanate (TODI), 4,4'-diphenyl ether diisocyanate, 4,4'-diphenyl diisocyanate, and 1,5-naphthalene diisocyanate (NDI); and the like.

Examples of polyisocyanate derivatives include dimers, trimers, biurets, allophanates, carbodiimides, uretdiones, urethoimines, isocyanurates, oxadiazinetriones, polymethylene polyphenyl polyisocyanates (crude MDI, polymeric MDI), crude TDI, and the like of polyisocyanate compounds mentioned above.

Of these, the isocyanate compound containing one isocyanate group per molecule is preferably phenyl isocyanate. The isocyanate compound containing two or more isocyanate groups per molecule is preferably an aromatic polyisocyanate, and more preferably MDI or crude MDI.

These isocyanate compounds (8) can be used alone or in a combination of two or more.

In the formula above, examples of the organic groups represented by A include mono- or di-alkylamino.

The amount of the modified imidazole (C1) to be used is usually 0.8 mol or more, preferably 1 to 3 mol, per mol of the isocyanate group contained in the isocyanate compound (8).

A solvent may or may not be used. When a solvent is used, a hydrocarbon solvent is suitably used. Examples of hydrocarbon solvents include aromatic hydrocarbon solvents, such as toluene, benzene, and xylene; aliphatic or alicyclic hydrocarbon solvents, such as methyl cyclohexane, cyclohexane, n-hexane, n-heptane, and octane; halogenated aliphatic hydrocarbon solvents, such as dichloromethane and chloroform; and halogenated aromatic hydrocarbon solvents, such as chlorobenzene and dichlorobenzene, with aromatic hydrocarbon solvents and halogenated aromatic hydrocarbon solvents being preferable, and toluene, xylene, and chlorobenzene being particularly preferable. The solvents may be used in combination of two or more, if necessary.

When a reaction liquid obtained by reacting the nitrogen-containing organic compound (5) with the dialkyl carbonate (6) is used as the modified imidazole (C1), the solvent in the reaction liquid can be directly used as a solvent for the reaction of the isocyanate compound (8) with the modified imidazole (C1). At this time, the reaction may be carried out by adding a solvent as needed.

When a solvent is used, the amount of the solvent used is usually 50 parts by weight or less, and preferably 0.1 parts by weight or more and 35 parts by weight or less, per part by weight of the modified imidazole (C1).

The reaction temperature is not particularly limited as long as it is the boiling point of the solvent or lower. The reaction temperature is usually 10° C. or higher, preferably 40 to 200° C., and particularly preferably 80 to 150° C.

The reaction may be performed in an atmosphere of inert gas that does not affect the reaction, such as nitrogen, argon, or helium, if necessary.

After completion of the reaction, the modified imidazole (C2) can be obtained by removing the solvent by concentrating or filtering the reaction liquid. The obtained modified imidazole (C2) can be purified by a method such as recrystallization.

Cationic Electrodeposition Paint Composition

The proportions of the cationic base-containing resin (A) and the blocked polyisocyanate compound (B) in the cationic electrodeposition paint composition of the present invention are preferably such that the solids content of component (A) is 50 to 90 parts by mass, and preferably 55 to 85 parts by mass; and the solids content of component (B) is 10 to 50 parts by mass, and preferably 15 to 45 parts by mass, based on 100 parts by mass of the total resin solids content of the components (A) and (B), so as to achieve excellent paint stability and obtain a coated article having excellent appearance and excellent corrosion resistance. Further, the proportion of the modified imidazole (C) is preferably, for example, 0.01 to 10 mass %, more preferably 0.1 to 8 mass %, and still more preferably 0.5 to 6 mass %, based on the total resin solids content of the cationic electrodeposition paint composition. Additionally, it is more preferable that the amine value of the entire resin contained in the paint be usually 20 to 100 mg KOH/g, and preferably 25 to 90 mg KOH/g, based on the resin solids content.

Having proportions or the amine value of the entire resin outside the above ranges is not preferable, since it may adversely affect the characteristics of the paint or coating film performance described above.

The method for producing the cationic electrodeposition paint composition of the present invention is not particularly limited. For example, the cationic electrodeposition paint composition may be produced by fully mixing the resin (A) and compound (B), and various additives, such as a surfactant and a surface control agent, to produce a preparation resin; dispersing the preparation resin in water; and adding to the dispersion of resin a pigment dispersion paste, water, an organic solvent, a neutralizer, and the like. The neutralizer is not particularly limited, and known organic acids may be used, among which formic acid, lactic acid, acetic acid, or a mixture thereof is preferable.

The modified imidazole (C) may be dispersed in water with the resin (A) and the compound (B), or may be dispersed together with a pigment and a resin for pigment dispersion to form a pigment dispersion paste to be incorporated in the paint.

The pigment dispersion paste contains pigments, such as a color pigment, a rust-preventive pigment, and an extender pigment, that have been dispersed as fine particles therein. For example, the pigment dispersion paste can be prepared by mixing a resin for pigment dispersion, a neutralizer, and pigments, and subjecting the mixture to a dispersion treatment in a dispersing mixer, such as a ball mill, a sand mill, and a pebble mill.

Known resins may be used as the resin for pigment dispersion without any particular limitation. Examples of usable resins include epoxy resin, acrylic resin, and surfactants having hydroxyl and cationic groups, such as tertiary amine epoxy resin, quaternary ammonium salt epoxy resin, tertiary sulfonium salt epoxy resin, tertiary amine acrylic resin, quaternary ammonium salt acrylic resin, tertiary sulfonium salt acrylic resin, and the like.

There is no particular limitation to the pigment, and known pigments may be used without any particular limitation. Examples of usable pigments include color pigments, such as titanium oxide, carbon black, and red iron oxide; and extender pigments, such as clay, mica, baryta, calcium carbonate, and silica.

To improve the curability of the coating film, a catalyst other than tin catalysts can be used in combination, if necessary. Examples of the catalyst used in combination include organic catalysts, zinc-based catalysts, bismuth-based catalysts, and the like, all of which being suitable for use.

Method for Forming a Coating Film

The present invention provides a method for forming a cationic electrodeposition coating film comprising the steps of immersing a substrate in an electrodeposition bath comprising the cationic electrodeposition paint composition described above, and applying a current using the substrate as a cathode. The present invention also provides a method for producing a coated article comprising the steps of immersing a substrate in an electrodeposition bath comprising the cationic electrodeposition paint composition, and applying a current across the substrate to form a coating film on the substrate.

Examples of substrates to which the cationic electrodeposition paint composition of the present invention is applied include automobile bodies, parts for two-wheeled vehicles, home appliances, and other appliances. The substrates are not particularly limited as long as they are made of metal.

Examples of metallic steel plates as substrates include cold-rolled steel plates, hot-dip galvanized steel plates, electro-galvanized steel plates, electrolytic zinc-iron duplex-plated steel plates, organic composite-plated steel plates, aluminum materials, magnesium materials, and the like. If necessary, the surface of these metal plates may be washed by alkali degreasing or the like, and then subjected to surface treatment, such as phosphate chemical conversion treatment, chromate treatment, or composite oxide treatment.

The cationic electrodeposition paint composition may be applied to a desired substrate surface by cationic electrodeposition coating. The cationic electrodeposition coating may be generally performed by using, as a bath, a cationic electrodeposition paint composition diluted with deionized water or the like to a solids concentration of about 5 to 40 mass %, and preferably 10 to 25 mass %, and to a pH of 4.0 to 9.0, and preferably 5.5 to 7.0. The temperature of the bath is usually adjusted to 15 to 35° C., and a current is applied thereto at a load voltage of 100 to 400 V, and preferably 150 to 350 V, using the substrate as a cathode. In general, after performing electrodeposition coating, the coated substrate is fully washed with ultrafiltrate (UF filtrate), reverse osmosis water (RO water), industrial water, pure water, or the like, to remove the excessive cationic electrodeposition paint adhered to the substrate.

The thickness of the electrodeposition coating film is not particularly limited. It is usually 5 to 40 μm, and preferably 10 to 30 μm, based on the thickness of the dry coating film. The electrodeposition coating film is bake-dried by being heated at a surface temperature of the coated article of usually 110 to 200° C., and preferably 140 to 180° C., for usually 10 to 180 minutes, and preferably 20 to 50 minutes, by means of a dryer such as an electric hot-air dryer or a gas hot-air dryer. By this bake drying, a cured coating film can be obtained.

Additionally, the present invention can encompass the following embodiments.

[1] A cationic electrodeposition paint composition comprising a cationic base-containing resin (A), a blocked polyisocyanate compound (B), and a modified imidazole (C) represented by the following Formula (1):

Formula (1)

wherein $R_1$, $R_2$, $R_3$, and $R_4$ may be identical or different, and each represents hydrogen or an organic group containing one or more carbon atoms, wherein the organic group may contain at least one member selected from the group consisting of oxygen, nitrogen, sulfur, and halogen, and two or more of $R_1$, $R_2$, $R_3$, and $R_4$ taken together may form a ring structure; and X represents oxygen or nitrogen, and when X represents oxygen, Y is absent and n is 1, and when X represents nitrogen, Y represents an organic group and n is an integer of 1 or more.

[2] The cationic electrodeposition paint composition according to [1], wherein the cationic base-containing resin (A) contains a cationic base-containing epoxy resin and/or a cationic base-containing acrylic resin.

[3] The cationic electrodeposition paint composition according to [1], wherein the cationic base of the cationic base-containing resin (A) is at least one member selected from the group consisting of an amino group, a quaternary ammonium base, and a sulfonium base.

[4] The cationic electrodeposition paint composition according to any one of [1] to [3], wherein the cationic base-containing resin (A) contains an amino group-containing epoxy resin, an amino group-containing epoxy resin, or both.

[5] The cationic electrodeposition paint composition according to any one of [1] to [4], wherein the organic groups represented by $R_1$, $R_2$, $R_3$, and $R_4$ are each independently alkyl, alkenyl, alkynyl, cycloalkyl, cycloalkylalkyl, hydroxyalkyl, alkoxy, thioalkoxy, alkoxyalkyl, thioalkoxyalkyl, aryl, arylalkyl, aralkyl, or a heterocyclic group.

[6] The cationic electrodeposition paint composition according to any one of [1] to [5], wherein
X represents oxygen;
$R_1$ and $R_4$ each represent an organic group containing 1 to 5 carbon atoms, wherein the organic group represented by $R_1$ and the organic group represented by $R_4$ are each independently alkyl, alkenyl, alkynyl, hydroxyalkyl, alkoxy, thioalkoxy, alkoxyalkyl, thioalkoxyalkyl, aryl, arylalkyl, aralkyl, or a heterocyclic group; and
$R_2$ and $R_3$ each represent hydrogen.

[7] The cationic electrodeposition paint composition according to any one of [1] to [5], wherein X represents nitrogen, and Y represents aryl or aralkyl.

[8] The cationic electrodeposition paint composition according to any one of [1] to [5], wherein Y represents a divalent group represented by Formula (2),
wherein $R_7$ and $R_8$ may be identical or different, and each represents hydrogen or alkyl; and p is an integer of 0 or more.

[9] The cationic electrodeposition paint composition according to any one of [1] to [5], wherein Y represents a divalent group represented by Formula (3),
wherein $R_9$, $R_{10}$, and $R_{11}$ may be identical or different, and each represents an organic group containing one or more carbon atoms, wherein the organic group may contain at least one member selected from the group consisting of oxygen, nitrogen, sulfur, and halogen;

s and t each represent 0 or 1, and when s and/or t are 0, the moiety:

represents hydrogen; and q, r, u, v, and w each independently represent an integer of 0 to 4, and when q is 0, at least one of s and t is 1.

[10] The cationic electrodeposition paint composition according to any one of [7] to [9], wherein Y is an organic group containing 21 or more carbon atoms.

[11] The cationic electrodeposition paint composition according to any one of [7] to [10], wherein $R_1$ or $R_4$ represents an organic group containing 6 to 18 (preferably 6 to 12) carbon atoms, wherein the organic group is alkyl, alkenyl, alkynyl, cycloalkyl, cycloalkylalkyl, hydroxyalkyl, alkoxy, thioalkoxy, alkoxyalkyl, thioalkoxyalkyl, aryl, arylalkyl, aralkyl, or a heterocyclic group.

[12] The cationic electrodeposition paint composition according to any one of [7] to [10], wherein one of $R_1$ and $R_4$ represents an organic group containing 1 to 5 carbon atoms, and the other of $R_1$ and $R_4$ represents an organic group containing 6 to 18 (preferably 6 to 12) carbon atoms, wherein the organic group represented by $R_1$ and the organic group represented by $R_4$ are each independently alkyl, alkenyl, alkynyl, cycloalkyl, cycloalkylalkyl, hydroxyalkyl, alkoxy, thioalkoxy, alkoxyalkyl, thioalkoxyalkyl, aryl, arylalkyl, aralkyl, or a heterocyclic group.

[13] The cationic electrodeposition paint composition according to any one of [7] to [10], wherein one of $R_1$ and $R_4$ represents an organic group containing 1 to 5 carbon atoms, and the other of $R_1$ and $R_4$ represents an organic group containing 6 to 18 (preferably 6 to 12) carbon atoms, wherein the organic group represented by $R_1$ and the organic group represented by $R_4$ are each independently alkyl, alkenyl, alkynyl, hydroxyalkyl, alkoxy, thioalkoxy, alkoxyalkyl, thioalkoxyalkyl, aryl, arylalkyl, aralkyl, or a heterocyclic group; and $R_2$ and $R_3$ each represent hydrogen.

[14] The cationic electrodeposition paint composition according to any one of [7] to [10], wherein $R_1$ and $R_4$ each represent an organic group containing 6 to 18 (preferably 6 to 12) carbon atoms, wherein the organic group represented by $R_1$ and the organic group represented by $R_4$ are each independently alkyl, alkenyl, alkynyl, cycloalkyl, cycloalkylalkyl, hydroxyalkyl, alkoxy, thioalkoxy, alkoxyalkyl, thioalkoxyalkyl, aryl, arylalkyl, aralkyl, or a heterocyclic group.

[15] The cationic electrodeposition paint composition according to any one of [7] to [14], wherein $R_2$ and $R_3$ each represent hydrogen.

[16] The cationic electrodeposition paint composition according to any one of [1] to [15], comprising 50 to 90 parts by mass of the cationic base-containing resin (A) and 10 to 50 parts by mass of the blocked polyisocyanate compound (B), on a solids content basis, based on 100 parts by mass of the total resin solids content of the cationic base-containing resin (A) and blocked polyisocyanate compound (B).

[17] The cationic electrodeposition paint composition according to any one of [1] to [16], wherein the modified imidazole (C) is present in an amount of 0.01 to 10 mass %, based on the total resin solids content of the cationic electrodeposition paint composition.

[18] A coating method comprising immersing a metal substrate in an electrodeposition paint bath comprising the cationic electrodeposition paint composition of any one of [1] to [17] to perform electrodeposition coating.

[19] A method for producing a coated article, comprising forming a coating film by the coating method of [18].

EXAMPLES

The present invention is described in more detail below with reference to Examples and Comparative Examples.

Known methods in the relevant technical fields were used for polymerization of various resins, production of paints, evaluation tests, and the like.

However, the present invention is not limited to these, and numerous various alterations and variations are encompassed within a scope equivalent to the technical idea and the scope of the claims of the present invention.

In all the Examples, the term "parts" denotes parts by mass, and "%" denotes percent by mass.

Production of Amino Group-Containing Epoxy Resin

Production Example 1

1200 parts of jER828EL (trade name, epoxy resin produced by Japan Epoxy Resin Co., Ltd., epoxy equivalent: 190, number average molecular weight: 350), 500 parts of bisphenol A, and 0.2 parts of dimethylbenzylamine were placed in a flask equipped with a stirrer, a thermometer, a nitrogen inlet tube, and a reflux condenser. The mixture was reacted at 130° C. until the epoxy equivalent was 850.

Subsequently, 160 parts of diethanolamine and 65 parts of ketiminated product of diethylenetriamine and methyl isobutyl ketone were added thereto, and the mixture was reacted at 120° C. for 4 hours. Thereafter, 480 g of ethylene glycol monobutyl ether was added to obtain an amino group-containing epoxy resin A-1 solution having a solids content of 80%. The amino group-containing epoxy resin A-1 had an amine value of 59 mg KOH/g and a number average molecular weight of 2100.

Production of Amino Group-Containing Acrylic Resin

Production Example 2

200 parts of propylene glycol monomethyl ether was placed in a flask equipped with a stirrer, a thermometer, a nitrogen inlet tube, and a reflux condenser. After the flask was purged with nitrogen, the temperature was maintained at 110° C. The following monomer mixture was then added thereto dropwise over 3 hours.

| | |
|---|---:|
| Styrene | 300 parts |
| N-Butyl acrylate | 60 parts |
| Methyl methacrylate | 60 parts |
| 2-Ethylhexyl methacrylate | 240 parts |
| 2-Hydroxyethyl methacrylate | 240 parts |
| Dimethyl aminoethyl methacrylate | 100 parts |
| 2,2'-Azobis(2-methylbutyronitrile) | 40 parts |

One hour after the completion of the dropwise addition, a solution obtained by dissolving 5 parts of 2,2'-azobis(2-methylbutyronitrile) in 40 parts of propylene glycol monomethyl ether was added dropwise over 1 hour. After the completion of the dropwise addition, the resulting product was maintained at 110° C. for another hour and adjusted with methyl isobutyl ketone to obtain an amino group-containing acrylic resin A-2 solution having a solids content of 80%. The amino group-containing acrylic resin A-2 had an amine value of 35 mg KOH/g, a hydroxy value of 104 mg KOH/g, and a number average molecular weight of 10000.

Production of Blocked Polyisocyanate Compound

Production Example 3

270 parts of Cosmonate M-200 (trade name, by Mitsui Chemicals, Inc., crude MDI, NCO group content=31.3%) and 127 parts of methyl isobutyl ketone were added to a reaction vessel and heated to 70° C. 236 parts of ethylene glycol monobutyl ether was added thereto dropwise over 1 hour and then heated to 100° C. While this temperature was maintained, sampling was performed over time. No absorption by unreacted isocyanate groups was confirmed by infrared spectroscopy, thus obtaining a blocked polyisocyanate B-1 having a resin solids content of 80%.

Production of Resin for Pigment Dispersion

Production Example 4

1010 parts of jER828EL (trade name, epoxy resin produced by Japan Epoxy Resin Co., Ltd., epoxy equivalent: 190, number average molecular weight: 350), 390 parts of bisphenol A, 240 parts of PLACCEL 212 (trade name, polycaprolactone diol produced by Daicel Chemical Industries, Ltd., weight average molecular weight=about 1250), and 0.2 parts of dimethylbenzylamine were placed in a flask equipped with a stirrer, a thermometer, a dropping funnel, and a reflux condenser. The mixture was reacted at 130° C. until the epoxy equivalent was about 1090. Subsequently, 134 parts of dimethylethanolamine and 150 parts of a 90% aqueous lactic acid solution were added thereto, and the mixture was reacted at 90° C. until the epoxy groups disappeared. Thereafter, propylene glycol monomethyl ether was added thereto to adjust the solids content, thus obtaining a quaternary ammonium base-containing resin for pigment dispersion having a solids content of 60%.

Production of Modified Imidazole

In the Production Examples of modified imidazole, the $^1$H NMR spectrum was determined on a Bruker AV400 at 400 MHz. IR spectroscopy was performed on an IRAffinity-1 Fourier transform infrared spectrophotometer produced by Shimadzu Corporation and a DuraSamplIRII produced by Smiths Detection, based on a total reflection measurement method.

Production Example 5: Production of Modified Imidazole A (10)

82.1 g (1.0 mol) of 1-methyl imidazole, 119.8 g (1.0 mol) of dimethyl carbonate, and 83.1 g of methanol were placed in a 500-mL autoclave purged with nitrogen, and the mixture was stirred at 120° C. for 22 hours. The obtained reaction mixture was cooled to 25° C., followed by drying under reduced pressure. The obtained white solid was washed with toluene and dried under reduced pressure, thus obtaining 47.8 g of modified imidazole A represented by Formula (10) above (1,3-dimethylimidazolium-2-carboxylate) (yield: 34%). The $^1$H-NMR analysis results of the modified imidazole A are shown as follows.

$^1$H-NMR (CD$_3$OD) δ (ppm)=7.46 (s, 2H), 4.08 (s, 6H).

Production Example 6: Production of Modified Imidazole B (11)

25.9 g (0.2 mol) of 1-butylimidazole, 25.0 g (0.3 mol) of dimethyl carbonate, and 26.2 g of methanol were placed in a 180-ml autoclave purged with nitrogen. The mixture was stirred at 125° C. for 19 hours, followed by further stirring at 130° C. for 4 hours. The obtained reaction mixture was cooled to 25° C., thus obtaining 73.0 g of a solution of modified imidazole B represented by Formula (11) above in methanol (purity content of the modified imidazole B: 34.3 g; yield: 95%). The $^1$H-NMR analysis results of the modified imidazole B are shown as follows.

$^1$H-NMR (CD$_3$OD) δ (ppm)=7.79 (s, 1H), 7.72 (s, 1H), 4.31 (t, J=7.4 Hz, 2H), 4.02 (s, 3H), 1.94-1.88 (m, 2H), 1.44-1.38 (m, 2H), 1.00 (t, J=7.2 Hz, 3H).

Production Example 7: Production of Modified Imidazole C (12)

3.0 g (21 mmol) of the modified imidazole A obtained in Production Example 5 (1,3-dimethylimidazolium-2-carboxylate), 100 mL of toluene, and 2.5 g (21 mmol) of phenyl isocyanate were placed in a three-necked flask purged with nitrogen, followed by stirring at 110° C. for 3 hours. The obtained reaction mixture was cooled to 25° C., followed by concentration under reduced pressure, thus obtaining 5.3 g of modified imidazole C represented by the above formula (purity content of the compound represented by Formula (12): 4.9 g; yield: 97%). The $^1$H-NMR analysis results of the modified imidazole C are shown as follows.

$^1$H-NMR (CD$_3$OD) δ (ppm)=7.45 (m, 2H), 7.35-7.27 (m, 4H), 7.00 (m, 1H), 3.98 (s, 6H).

Production Example 8: Production of Modified Imidazole D 52.9 g (414.1 mmol of isocyanate groups) of Sumidur 44V20L (produced by Sumika Covestro Urethane Co., Ltd., crude MDI, isocyanate content: 33%) and 400 mL of toluene were placed in a 1-L four-necked flask purged with nitrogen. The mixture was ice-cooled (internal temperature: 6° C.), and a solution of 50.0 g (207.1 mmol) of di(2-ethylhexyl) amine in 100 mL of toluene was added thereto dropwise while stirring. The mixture was then stirred at room temperature for 1 hour.

Figure 1:
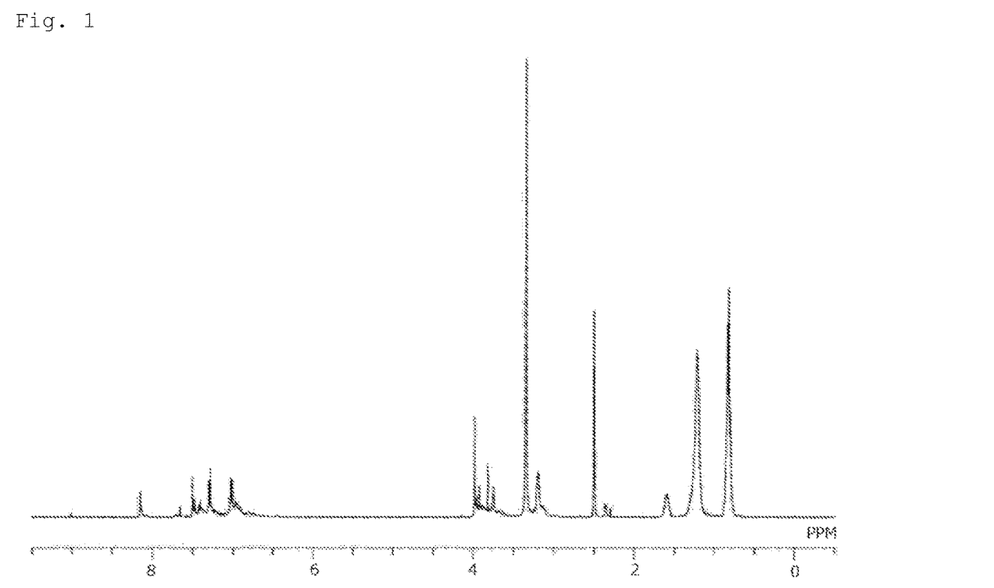
FIG. 1 is a graph showing the $^1$H-NMR (DMSO-$d_6$) analysis results of the modified imidazole D in Production Example 8.
Figure 2:
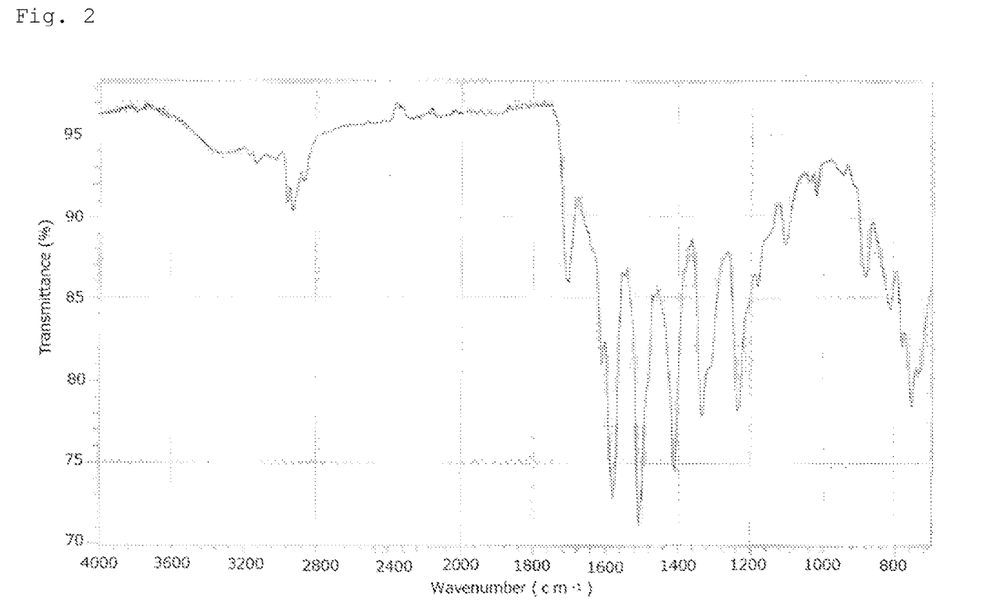
FIG. 2 is a graph showing the IR analysis results of the modified imidazole D in Production Example 8.

29.0 g (207.1 mmol) of the modified imidazole A (1,3-dimethylimidazolium-2-carboxylate) obtained in Production Example 5 was added to the resulting reaction liquid, followed by stirring at 110° C. for 2 hours. The obtained reaction mixture was dried under reduced pressure, and the obtained concentrated residue was washed twice with 500 mL of water, followed by drying under reduced pressure to thus obtain 93.9 g of modified imidazole D. It is presumed that the modified imidazole D is a composition comprising a compound having a structure represented by Formula (13) above. FIG. 1 shows the $^1$H NMR (DMSO-dc) analysis results of the modified imidazole D, and FIG. 2 shows the IR analysis results.

Production Example 9: Production of Modified Imidazole E (14)

25.0 g (139 mmol) of 1-octylimidazole, 16.7 g (185 mmol) of dimethyl carbonate, and 25.1 g of methanol were placed in a 180-mL autoclave purged with nitrogen, followed by stirring at 125° C. for 29 hours. The resulting reaction mixture was cooled to or below the boiling point of the solvent, and 8.5 g (94 mmol) of dimethyl carbonate was added thereto, followed by stirring at 130° C. for another 3 hours. The obtained reaction mixture was cooled to 25° C., thus obtaining 44.0 g of a solution of 1-octyl-3-methylimidazolium-2-carboxylate in methanol (purity: 33.0 g, yield: 99%). The $^1$H-NMR analysis results of 1-octyl-3-methyl-imidazolium-2-carboxylate are shown as follows.

$^1$H-NMR (CD$_3$OD) δ (ppm)=7.67 (s, 1H), 7.61 (s, 1H), 4.22 (t, J=7.2 Hz, 2H), 3.94 (s, 3H), 1.91-1.84 (m, 2H), 1.32-1.26 (m, 10H), 0.85 (t, J=7.2 Hz, 3H)

Subsequently, 4.0 g of a solution of 1-octyl-3-methylimidazolium-2-carboxylate in methanol (purity content of 1-octyl-3-methylimidazolium-2-carboxylate: 3.0 g (13 mmol)), 1.5 g (13 mmol) of phenyl isocyanate, and 100 mL of toluene were placed in a 200-ml test tube purged with nitrogen, followed by stirring at 110° C. for 3 hours. The obtained reaction mixture was cooled to 25° C., followed by concentration under reduced pressure, thus obtaining 3.3 g of modified imidazole E represented by Formula (14) above (yield: 84%). The $^1$H-NMR analysis results of the modified imidazole E are shown as follows.

(13)

$^1$H-NMR (CD$_3$OD) δ (ppm)=7.51 (s, 1H), 7.45-7.33 (m, 6H), 4.37 (t, J=7.4 Hz, 2H), 3.97 (s, 3H), 1.91-1.86 (m, 2H), 1.35-1.27 (m, 10H), 0.88 (t, J=6.8 Hz, 3H).

Production Example 10: Production of Modified Imidazole F (15)

77.5 g (0.60 mol) of octylamine was placed in a 300-mL 4-necked reactor purged with nitrogen, and the reaction liquid was cooled to 10° C. or lower. Next, a liquid mixture of 22.9 g of 40% aqueous formaldehyde solution (formaldehyde purity content: 0.30 mol) and 27.0 g (0.45 mol) of acetic acid was added thereto dropwise over 2 hours, followed by stirring at 0° C. for 30 minutes. Thereafter, the temperature was returned to room temperature, 43.5 g of 40% aqueous glyoxal solution (glyoxal purity content: 0.30 mol) was added thereto, and the resulting mixture was stirred at room temperature for 20 hours. After stirring, the obtained reaction mixture was washed three times with 50 g of heptane, and the obtained aqueous layer was concentrated under reduced pressure to thus obtain 108.4 g of 1,3-dioctylimidazolium acetate. The $^1$H-NMR analysis results of 1,3-dioctylimidazolium acetate are shown as follows.

$^1$H-NMR (DMSO-d6) δ (ppm)=9.32 (s, 1H), 7.80 (s, 2H), 4.17 (t, J=9.6 Hz, 4H), 1.78 (m, 4H), 1.63 (s, 3H), 1.23 (m, 20H), 0.85 (t, J=6.4 Hz, 6H)

Subsequently, 10.0 g (0.03 mol) of 1,3-dioctylimidazolium acetate, 50.0 g of chlorobenzene, and 3.0 g of molecular sieve 4 A were placed, and allowed to stand under nitrogen for 16 hours. Then, the molecular sieve 4 A was removed by filtration, the resulting solution was placed in a 200-mL three-necked reactor purged with nitrogen, and 15.4 g (0.10 mol) of N-methylphenylcarbamate was added thereto, followed by stirring at 130° C. for 4 hours. After stirring, the obtained reaction mixture was concentrated under reduced pressure to thus obtain 24.0 g of a brown solid. The obtained brown liquid was isolated using an alumina column, thus obtaining a compound represented by Formula (15) above, i.e., modified imidazole F. The $^1$H-NMR analysis results of the modified imidazole F are shown as follows.

$^1$H NMR (DMSO-d6) δ (ppm)=7.60 (s, 2H), 7.41 (d, J=8.4 Hz, 2H), 7.12 (d, J=8.4 Hz, 2H), 6.79 (t, J=8.4 Hz, 1H), 4.48 (t, J=7.2 Hz, 4H), 1.79 (m, 4H), 1.28 (m, 20H), 0.87 (t, J=7.2 Hz, 6H)

Production of Pigment Dispersion Paste

Production Example 11

8.3 parts (solids content: 5 parts) of the quaternary ammonium base-containing resin for pigment dispersion having a solids content of 60% obtained in Production Example 4, 14.5 parts of titanium oxide, 7.0 parts of purified clay, 0.3 parts of carbon black, 2 parts of dioctyltin oxide (catalyst), and 20.3 parts of deionized water were added and dispersed in a ball mill for 20 hours, thus obtaining a pigment dispersion paste P-1 having a solids content of 55%.

Production Examples 12 to 20

Pigment dispersion pastes P-2 to P-5 having a solids content of 55% were obtained in the same manner as in Production Example 11, except that the type of the catalyst was changed as shown in the following Table 1 (Production Examples 12 to 15). A pigment dispersion paste P-6 having a solids content of 55% was obtained in the same manner as in Production Example 11, except that the type and amount of the catalyst were changed as shown in the following Table 1, and that 4 parts of purified clay was used (Production Example 16). Pigment dispersion pastes P-7 to P-9 having a solids content of 55% were obtained in the same manner as in Production Example 11, except that the type of the catalyst was changed as shown in the following Table 1 (Production Examples 17 to 19). Pigment dispersion paste P-10 having a solids content of 55% was obtained in the same manner as in Production Example 11, except that a catalyst was not used as shown in the following Table 1, and that 9 parts of purified clay was used (Production Example 20).

TABLE 1

| Production Example | Pigment dispersion paste | Type of catalyst | Water solubility of catalyst | Amount of catalyst |
|---|---|---|---|---|
| Production Example 11 | P-1 | Dioctyltin oxide | Insoluble | 2 parts |
| Production Example 12 | P-2 | <br>Modified imidazole A | Soluble | 2 parts |

TABLE 1-continued

| Production Example | Pigment dispersion paste | Type of catalyst | Water solubility of catalyst | Amount of catalyst |
|---|---|---|---|---|
| Production Example 13 | P-3 | Modified imidazole B | Soluble | 2 parts |
| Production Example 14 | P-4 | Modified imidazole C | Insoluble | 2 parts |
| Production Example 15 | P-5 | Modified imidazole D | Insoluble | 2 parts |
| Production Example 16 | P-6 | Modified imidazole D | | 5 parts |
| Production Example 17 | P-7 | Modified imidazole E | Insoluble | 2 parts |
| Production Example 18 | P-8 | Modified imidazole F | Insoluble | 2 parts |
| Production Example 19 | P-9 | 1,3-Dimethylimidaolium chloride (by Tokyo Chemical Industry Co., Ltd.) | Soluble | 2 parts |
| Production Example 20 | P-10 | No catalyst | | |

Production of Cationic Electrodeposition Paint

Example 1

87.5 parts (solids content: 70 parts) of the amino group-containing epoxy resin A-1 obtained in Production Example 1 and 37.5 parts (solids content: 30 parts) of the blocked polyisocyanate B-1 obtained in Production Example 3 were mixed, and 13 parts of 10% acetic acid was further added to the mixture. After the mixture was uniformly stirred, deionized water was added dropwise with vigorous stirring over a period of about 15 minutes to obtain an emulsion having a solids content of 34%. Thereafter, 294 parts (solids content: 100 parts) of the emulsion obtained above, 52.4 parts of the pigment dispersion paste P-2 obtained in Production Example 12, and 350 parts of deionized water were added thereto to thus obtain a cationic electrodeposition paint X-1 having a solids content of 20%.

Examples 2 to 9 and Comparative Examples 1 to 3

Cationic electrodeposition paints X-2 to X-12 were produced in the same manner as in Example 1, except that the type and amount of the amino group-containing resin and pigment dispersion paste were changed as shown in the following Table 2, instead of using the amino group-containing epoxy resin A-1 and the pigment dispersion paste P-2.

The table also shows the results of evaluation tests (curability and appearance) described below. The paint containing dioctyltin oxide, which was at a passing level according to the evaluation results, was used as a Comparative Example since it is considered to be failing in terms of environmental aspects (toxicity).

The amounts of the resin shown in the table are all values based on solids content.

Production of Test Plates

Each of the cationic electrodeposition paints obtained in the Examples and Comparative Examples was electrodeposited onto cold-rolled steel plate substrates (150 am (length)× 70 mm (width)×0.8 mm (thickness)) that had been chemical-conversion-treated with Palbond #3020 (trade name, by Nihon Parkerizing Co., Ltd., zinc phosphate treating agent) so as to have a dry film thickness of 17 μm. The resulting films were cured by drying at 150° C. or 170° C. for 20 minutes to obtain test plates (two plates each).

Appearance (Surface Roughness)

Using a Surftest 301 (trade name, by Mitutoyo Corporation, surface roughness tester), the surface roughness (Ra) of the coating films on the test plates was measured with a cut-off length of 0.8 mm and evaluated in accordance with the following criteria. In the evaluation, S to B are considered to be passing, and C is considered to be failing.

S: Surface Roughness (Ra) is less than 0.2.
A: Surface Roughness (Ra) is not less than 0.2 but less than 0.25.
B: Surface Roughness (Ra) is not less than 0.25 but less than 0.3.
C: Surface Roughness (Ra) is not less than 0.3.

Curability (Gel Fraction)

The curability (gel fraction) at 150° C. and 170° C. was evaluated using the obtained test panels.

In the evaluation, A and B are considered to be passing, and C is considered to be failing.

A: Gel fraction is not less than 90%.
B: Gel fraction is not less than 70% but less than 90%.
C: Gel fraction is less than 70%.

TABLE 2

| Examples and Comparative Examples | | Examples | | | | | | | | | Comparative Examples | | |
|---|---|---|---|---|---|---|---|---|---|---|---|---|---|
| | | 1 | 2 | 3 | 4 | 5 | 6 | 7 | 8 | 9 | 1 | 2 | 3 |
| | Name of cationic electrodeposition paint | X-1 | X-2 | X-3 | X-4 | X-5 | X-6 | X-7 | X-8 | X-9 | X-10 | X-11 | X-12 |
| (A) | Amino group-containing epoxy resin (A-1) | 70 parts | 70 parts | | 70 parts | 70 parts | | 70 parts | 70 parts | 70 parts | 70 parts | 70 parts | 70 parts |
| | Amino group-containing acrylic resin (A-2) | | | 70 parts | | | 70 parts | | | | | | |
| (B) | Blocked polyisocyanate (B-1) | 30 parts | 30 parts | 30 parts | 30 parts | 30 parts | 30 parts | 30 parts | 30 parts | 30 parts | 30 parts | 30 parts | 30 parts |
| (C) | Name of pigment paste | P-2 | P-3 | P-3 | P-4 | P-5 | P-5 | P-6 | P-7 | P-8 | P-1 | P-9 | P-10 |
| Evaluation results | Curability at 170° C. | A | A | A | A | A | A | A | A | A | A | B | B |
| | Curability at 150° C. | B | B | B | B | B | B | A | A | A | B | B | C |
| | Appearance | B | B | B | A | S | S | S | S | S | S | C | S |

The gel fraction was measured according to the following procedure.
(1) Measuring the mass of the test panel before coating (X).
(2) Performing electrodeposition coating and baking, and measuring the mass of the test panel having the cured coating film (Y).
(3) Immersing the test panel in acetone, and subjecting it to treatment for 5 hours while heating and refluxing.
(4) Drying the test panel after the treatment, and measuring the mass of the test panel (Z).
(5) Calculating the gel fraction (%) by using the following equation:

Gel fraction (%)=[Z–X]/[Y–X]×100.

The invention claimed is:

1. A cationic electrodeposition paint composition comprising a cationic base-containing resin (A), a blocked polyisocyanate compound (B), and a modified imidazole (C) represented by the following Formula (1):

Formula (1)

wherein $R_1$, $R_2$, $R_3$, and $R_4$ may be identical or different, and each represents hydrogen or an organic group containing one or more carbon atoms, wherein the organic group may contain at least one member selected from the group consisting of oxygen, nitrogen, sulfur, and halogen, and two or more of $R_1$, $R_2$, $R_3$, and $R_4$ taken together may form a ring structure; and X represents nitrogen, Y represents an organic group and n is an integer of 1 or more.

2. The cationic electrodeposition paint composition according to claim 1, wherein the cationic base-containing resin (A) contains a cationic base-containing epoxy resin and/or a cationic base-containing acrylic resin.

3. The cationic electrodeposition paint composition according to claim 1, wherein the cationic base of the cationic base-containing resin (A) is at least one member selected from the group consisting of an amino group, a quaternary ammonium base, and a sulfonium base.

4. The cationic electrodeposition paint composition according to claim 1, wherein the modified imidazole (C) is present in an amount of 0.01 to 10 mass %, based on the total resin solids content of the cationic electrodeposition paint composition.

5. A coating method comprising immersing a metal substrate in an electrodeposition paint bath comprising the cationic electrodeposition paint composition of claim 1 to perform electrodeposition coating.

6. A method for producing a coated article, comprising forming a coating film by the coating method of claim 5.

7. A coating method comprising immersing a metal substrate in an electrodeposition paint bath comprising the cationic electrodeposition paint composition of claim 2 to perform electrodeposition coating.

8. A coating method comprising immersing a metal substrate in an electrodeposition paint bath comprising the cationic electrodeposition paint composition of claim 3 to perform electrodeposition coating.

9. A coating method comprising immersing a metal substrate in an electrodeposition paint bath comprising the cationic electrodeposition paint composition of claim 4 to perform electrodeposition coating.

* * * * *